(12) United States Patent
Nakashima et al.

(10) Patent No.: US 7,676,610 B2
(45) Date of Patent: Mar. 9, 2010

(54) DEVICE AND METHOD FOR OPTIMIZATION OF TARGET HOST DEVICE PROCESS HANDLING ACCORDING TO THE STATUS AND THE PRIORITY OF THE TARGET HOST DEVICE PROCESS

(75) Inventors: Kohta Nakashima, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 113 days.

(21) Appl. No.: 11/342,834

(22) Filed: Jan. 31, 2006

(65) Prior Publication Data

US 2006/0224785 A1    Oct. 5, 2006

(30) Foreign Application Priority Data

Mar. 31, 2005    (JP) .............................. 2005-100780

(51) Int. Cl.
*G06F 3/00* (2006.01)
*G06F 13/28* (2006.01)
(52) U.S. Cl. ............................ 710/48; 710/22; 710/40
(58) Field of Classification Search ................... None
See application file for complete search history.

(56) References Cited

U.S. PATENT DOCUMENTS 5,414,858 A * 5/1995 Hoffman et al. ............... 710/48
6,378,051 B1 * 4/2002 Henson et al. ............... 711/151
6,615,161 B1 * 9/2003 Carney et al. ............... 702/186
2006/0117316 A1 * 6/2006 Cismas et al. ............... 718/103

FOREIGN PATENT DOCUMENTS

| JP | 03-028951 | 2/1991 |
|---|---|---|
| JP | 06-019823 | 1/1994 |
| JP | 2002-259143 | 9/2002 |
| JP | 2002-342093 | 11/2002 |
| JP | 2004-326486 | 11/2004 |

* cited by examiner

*Primary Examiner*—Henry W. H. Tsai
*Assistant Examiner*—Juanito C Borromeo
(74) *Attorney, Agent, or Firm*—Staas & Halsey LLP

(57) ABSTRACT

An input/output device stores host status information about the status of a host, and controls the input/output of data. By referring to the input/output information and the host status information, the device performs optimization control of selecting notification either by an interrupt process or a non-interrupt process. When a notification by the interrupt process is selected, data transfer control is performed to the host, and the data is transferred to the host by an interrupt. When a notification by the non-interrupt process is selected, data transfer control is performed to the host, and notification control is performed to transfer the data to the host by polling.

17 Claims, 12 Drawing Sheets

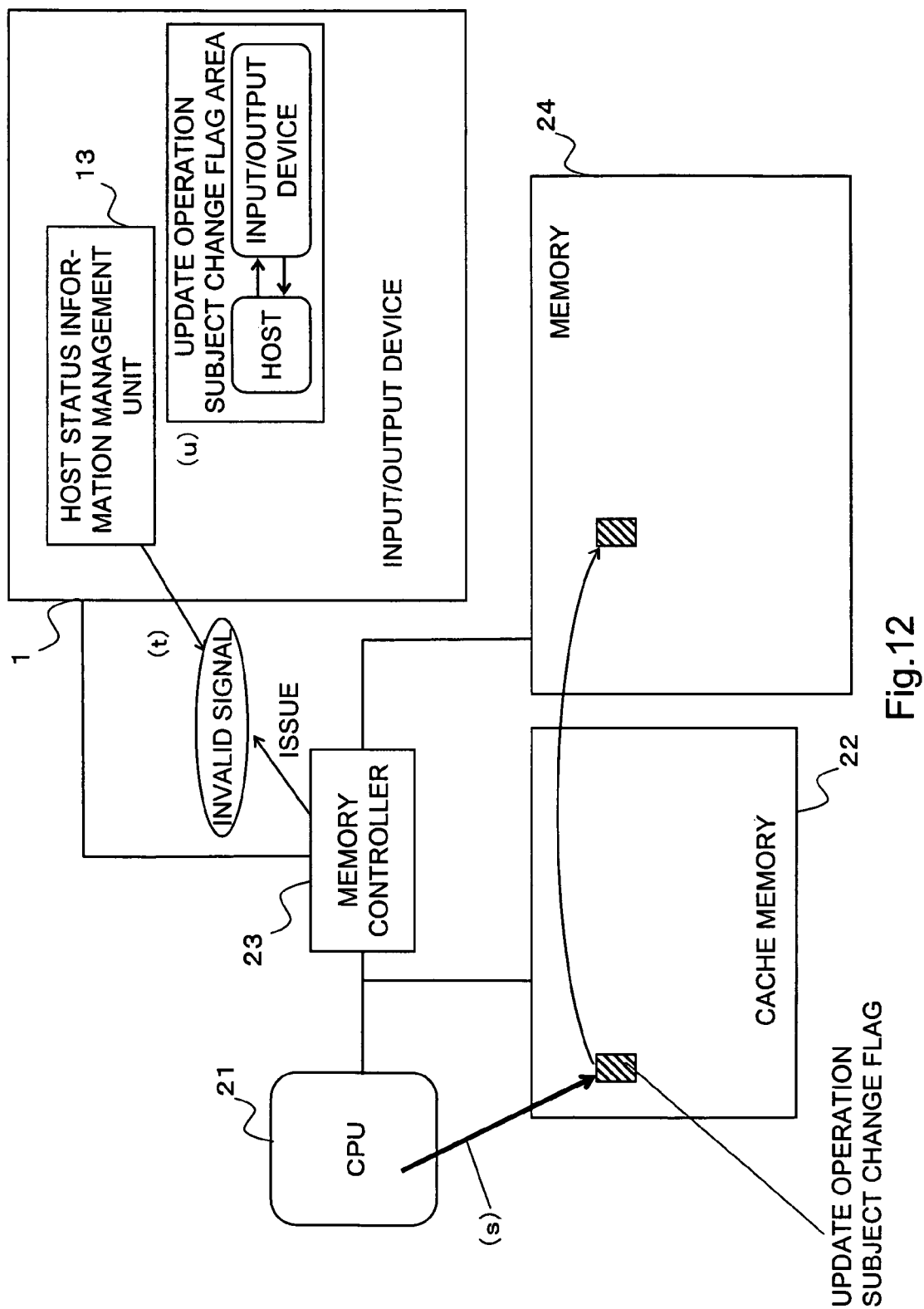

DEVICE AND METHOD FOR OPTIMIZATION OF TARGET HOST DEVICE PROCESS HANDLING ACCORDING TO THE STATUS AND THE PRIORITY OF THE TARGET HOST DEVICE PROCESS

CROSS-REFERENCE TO RELATED APPLICATIONS

This application claims priority from Japanese patent application Serial no. 2005-100780 filed on Mar. 31, 2005, the contents of which are herein incorporated by reference.

BACKGROUND OF THE INVENTION

1. Field of the Invention

The present invention relates to the data input/output processing technology for data input/output control with a host processing device. The present invention is designed to reduce a load on the host processing device in a data processing system requiring high-speed input/output control over 1 Gbps. The present invention can be applied in the field of a PC cluster, a storage system, an enterprise server and so on.

2. Description of the Related Art

When an input/output process of data, etc. is performed between a host processing device (hereinafter referred to simply as a host) and a data input/output device (hereinafter referred to simply as an input/output device), the input/output device normally performs a data input/output process without considering the status of the process of the host, the status of the host such as the utilization factor of the CPU, etc. For example, although the utilization factor of the CPU of the host is very high when an input/output process is performed, the input/output device performs a data input/output process and an interrupt process with the host.

Additionally, the input/output device does not consider the relationship between an input/output process and a given process. Therefore, even when there are plural input/output processes for transferring processes having different priorities, every input/output process is equally handled. Furthermore, the input/output process is performed regardless of the status of a process corresponding to the input/output process. Therefore, a notification of an input/output process having a low emergency level is transmitted to the host in an interrupt process.

However, with an increasing number of stages of pipelines for use in a recent high-speed clock of the CPU, the cost of the interrupt process in the host has increased. Especially, with improved performance of the input/output device, the number of occurrences of the interrupt process increases, thereby also increasing the influence of the interrupt process on the entire performance of the host.

In the above-mentioned situation, the interrupt coalescing technique is used to reduce the number of occurrences of the interrupt process. The interrupt coalescing technique collectively performs the interrupt process on plural input/output requests. For example, the number of occurrences of the interrupt process is decreased by performing one interrupt process for n times of input/output process. Otherwise, the number of occurrences of the interrupt process can be decreased by suppressing the occurrences of the interrupt process for a predetermined time period after an occurrence of an input/output request, and performing one interrupt process with the interrupts for the input/output processes which occur during the time period grouped as one interrupt.

Another method is executed as a masking process on an interrupt on the host side. For example, when the utilization factor of the CPU is a predetermined value or more, the host masks the interrupt, thus improving the performance of the CPU.

As a method of approximating the interrupt coalescing technique, there is also a method of reducing the overhead of the interrupt process by collectively transmitting a notification of events or messages. For example, refer to the patent document 1 (Japanese Patent Laid-open Publication No. 2002-342093).

It has become important to efficiently use a high-speed network over 1 Gbps that has been introduced lately. Especially, with an increasing speed of a network, a protocol process, a copying process, an interrupt process, and the like have become widespread. In this situation, since the load on the host has considerably increased, there is a request to reduce the load on the host.

However, in the related art, the input/output device has performed the input/output process without considering the status of the host. For example, although the utilization factor of the CPU is almost 100%, a number of interrupt processes have been performed, or although there is no merit of immediately performing the input/output process, the input/output process has been performed. Thus, the performance of the host is degraded by a disturbance from the data input/output device.

When the number of occurrences of the interrupt process is reduced as in the above-mentioned interrupt coalescing technique for reducing the load on the host, there occurs the problem of a prolonged delayed time in the input/output process. Additionally, since the emergency level of the input/output process is not considered in the interrupt coalescing technique, there also occurs the problem that the input/output process is eventually inefficient.

Furthermore, since the process of masking an interrupt in the host normally issues a notification to a controller, it imposes a high load on the host, and is not an effective method for reducing the cost for the host. In the interrupt masking process, a masking process is performed on an interrupt even in a high-priority process. Therefore, there occurs the problem that the response characteristic of a high-priority process is degraded.

The object of the present invention is to provide a data input/output device capable of suppressing the increase of the process load on the host by an occurrence of an interrupt process accompanying an input/output process, and efficiently performing a data input/output process for the host without degrading the response characteristic of the input/output process.

SUMMARY OF THE INVENTION

The present invention holds the information about the process performed by a host, and the host status information about the operation status of the host, etc., and controls the transfer of input/output data to the host according to the acquired host status information.

In the present invention, when an input/output notification unit transmits a notification of data input and output to a host processing device either in an interrupt process of processing an interrupt in the host processing device or a non-interrupt process of not processing an interrupt, either the interrupt process or the non-interrupt process is selected according to the host status information acquired from the host processing device and stored in the host status information storage unit. The input/output notification unit notifies the host processing device of the data input/output in the process selected by the optimization unit. As a notifying process by the non-interrupt process, for example, a process of notifying the transfer process of the input/output data to the host is performed by the polling process to a predetermined flag which indicates the presence of the input/output data is provided in the host.

Thus, by grasping the status of the host, the input/output of the data not used in an emergency can be transfer-controlled not to perform the interrupt process in the host, thereby suppressing the increase in load on the host in the interrupt process.

The host status information acquisition unit according to the present invention can acquire the process status information including at least the priority of the process as the host status information from the host processing device and stores it, and the optimization unit designates the process (hereinafter referred to as a target process) to be handled in the input/output data transfer process, compares the priority of the target process with the priority of the process being performed in the host processing device, and selects the notification by the non-interrupt process when the priority of the target process is lower than the priority of the process being performed.

Otherwise, the host status information acquisition unit can acquire the process status information including the information about at least each status of the process status of "Run", "Ready", and "Wait" as the host status information from the host processing device and stores the information, and the optimization unit selects the notification by the non-interrupt process when the process status of the designated target process is "Ready".

Or the host status information acquisition unit can acquire the process status information including the information about at least each status of the process status of "Run", "Ready", and "Wait" and the priority of the process as the host status information from the host processing device and stores the information, and the optimization unit compares the priority of the target process with the priority of the process being performed in the host processing device when the process status of the designated target process is "Wait", and selects the notification by the non-interrupt process when the priority of the target process is lower than the priority of the process being performed.

Otherwise, the host status information acquisition unit can acquire the utilization factor of the CPU of the host processing device and stores the factor, and the optimization unit selects the notification by the non-interrupt process when the utilization factor of the CPU of the host status information storage unit is a predetermined value or less.

Thus, the host determines the status and the priority of the process being performed by the host, the load status of the host itself, etc., and can select, for example, the notification by the polling process when there is a small possibility that the input/output data is to be used soon or when the load on the host is heavy. Therefore, the load on the host applied when the data input/output is controlled can be reduced. Furthermore, when the input/output data is required soon or when the load on the host is light, the notification by the interrupt process can be normally selected, thereby maintaining the response characteristic of the process. As a result, an efficient data input/output device can be realized without degrading the load status of the host and the response characteristic of the data input/output.

Furthermore, according to the present invention, both the host and the data input/output device can acquire the host status information stored in the data input/output device.

Especially, when the data input/output device collects the host status information, the device can efficiently collect the host status information at a low cost using the memory consistency maintenance facility of the host.

When a status update start flag area and a status update end flag area which are set in advance in the storage area of the host are updated, the host status information acquisition unit according to the present invention detects an invalid area signal (invalid notification) which is issued by the memory consistency maintenance facility of the host when the update is performed. By the detection of the invalid area signal, monitoring the update of the process status information in the host is started, updated process status information areas are listed, and the address information about the listed process status information areas is recorded. When the invalid area signal issued when the status update end flag area is updated is detected, monitoring the update of the process status information terminates. The status information collection unit collects the process status information from the updated process status information area according to the address information stored by the status information update detection unit.

Thus, when the input/output device collects the process status information from the host, the device can determine the presence/absence of the update of the process status information using the invalid area signal issued by rewriting the status update start flag and the status update end flag, only has to monitor the update of the process status information during the period in which the process status information is updated, and can efficiently perform the process of collecting the process status information at a low cost.

Furthermore, according to the present invention, the host selects the host status information collecting/updating process on the process status information, etc. by defining a device with a lower load as an operation subject by comparing the overload of the host or the loads between the host and the input processing device, and notifies the input/output device of the selected operation subject.

The updating operation subject setting unit according to the present invention sets one of the input/output device and the host in the updating operation subject storage unit as an operation subject of the host status information collecting/updating process according to the notification of the operation subject set by the host, and the host status information acquisition unit collects the host status information from the host processing device when the input/output device is set in the updating operation subject storage unit, and receives the host status information transmitted from the host when the host processing device is set in the updating operation subject storage unit. Thus, for example, the input/output device can collect the host status information when the host determines that the host itself is in the overload state, etc.

Furthermore, the updating operation subject setting unit according to the present invention detects the invalid area signal issued when the updating operation subject change flag area set in the storage area of the host is updated, and switch the setting of the status updating operation subject storage unit. Thus, the switch notification of the operation subject of the host status information collecting/updating process can be performed at a low cost.

The present invention acquires and stores the priority of the process performed by the host as host status information, and the optimizing process acquires the priority of the process as the destination of the data of data input/output control based on the priority of the process stored in the host status information storage unit, and determines the order of the data transfer control in order from the highest priority of the destination process. Then, the transfer control unit controls the data transfer in the order determined by the optimization unit.

Thus, the data can be transferred in the order of the process priority from the input/output data having the highest degree of urgency.

The present invention is also a program used to direct a computer to control input/output of data with the host processing device, and directs the computer to use the technology executed by each of the above-mentioned processing unit. The program for realizing the present invention can be stored in an appropriate computer-readable recording medium such as portable medium memory, semiconductor memory, a hard disk, etc., and can be provided after stored in these recording media, or provided by input/output over a communication interface using various communication networks.

As described above, the present invention can provide a data input/output device capable of selecting the method of giving a notification of a data input/output process based on the relationship among the operation status of the host, the status and the priority of a process performed by the host, and the input/output data to be transferred, and performing transfer control by suppressing the load on the host without degrading the response characteristic for the process.

Furthermore, according to the present invention, since information can be collected and updated by designating the update period of the process status information using the memory consistency maintenance facility provided for the host when the process status information is collected as host status information, the data input/output device can be provided at a low cost.

According to the present invention, since the operation subject for collecting the host status information can be selected by determining the levels of the loads on the host and the data input/output device, the data input/output device can be provided with a distributed cost.

Additionally, according to the present invention, since the order of the transfer process on the input/output data can be determined based on the priority of the process executed by the host, the data input/output device can be provided with more improved response characteristic for the processes by first transferring more urgent data on a priority basis.

BRIEF DESCRIPTION OF THE DRAWINGS

FIG. 12 is an explanatory view of the change notification process of the operation subject of the update process based on the cache consistency maintenance facility.

DETAILED DESCRIPTION OF THE PREFERRED EMBODIMENTS

Figure 1:
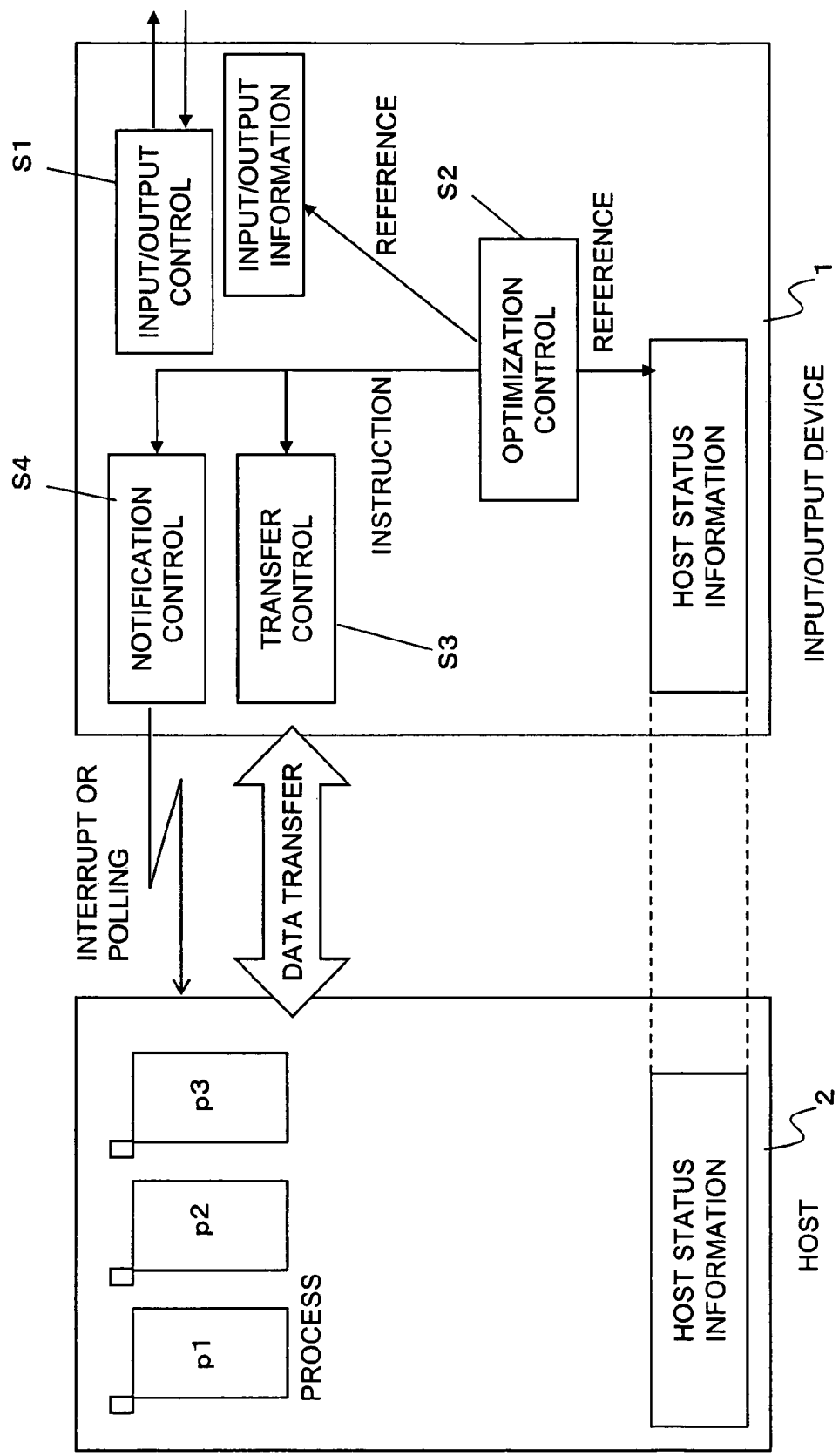
FIG. 1 is an explanatory view showing the principle of the present invention.

FIG. 1 is an explanatory view showing the principle of the present invention. An input/output device 1 according to the present invention acquires and stores in the device the host status information such as the status information about a process performed in the host 2, the priority, the utilization factor of the CPU of a host 2, etc. as the information about the status of the host 2.

The input/output device 1 performs, for example, transfer control of the data input to and output from the host 2 (step S1). The optimizing control of selecting notification of either providing notification of a transfer process by generating an interrupt process based on the priority of the process executed by the host 2 and the operation status of the host 2 by referring to the information (input/output information) about the input/output data and the stored status information about the host, or providing notification of a transfer process by another process (non-interrupt process) without generating an interrupt is performed (step S2). When the notification by the interrupt process is selected, the input/output data is transferred to the host 2 by the transfer control (step S3). Additionally, notification control is performed to transmit the transfer process to the host 2 by interrupt processing (step S4).

When the notification by the non-interrupt process is selected, the input/output data is transferred to the host 2 by the transfer control (step S3). Furthermore, notification to the host 2 is performed in the non-interrupt process by the notification control. For example, a notification is made by the polling process on a predetermined flag indicating the existence of the input/output data in the host 2 (step S4).

Figure 2:
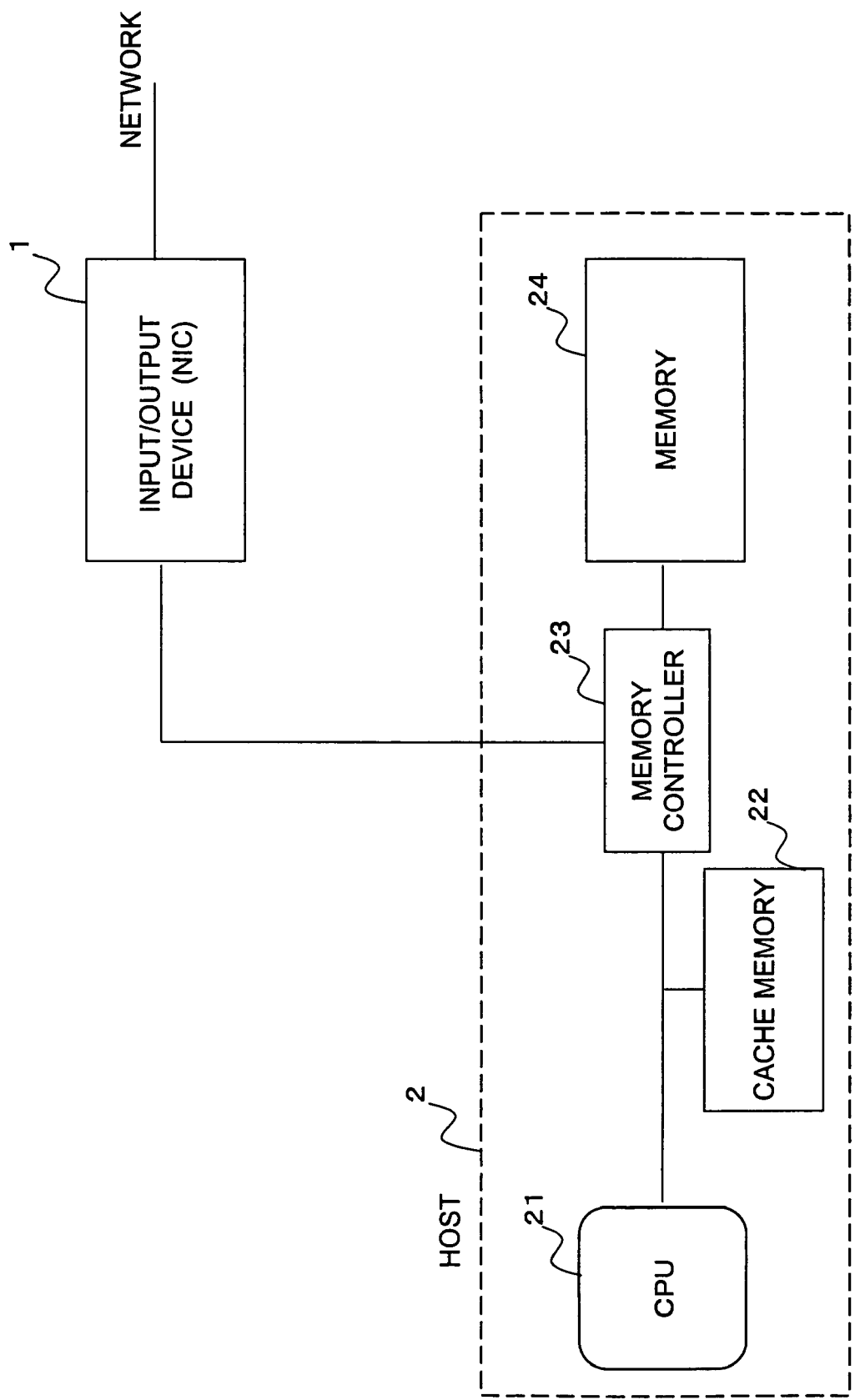
FIG. 2 shows an example of the configuration of the data processing system according to an embodiment of the present invention.

FIG. 2 shows an example of the configuration of the data processing system according to an embodiment of the present invention. In the embodiment, the input/output device 1 is a network interface card (NIC) for control of input/output of data over a network.

The host 2 includes a CPU 21, cache memory 22, a memory controller 23, and memory 24. The host 2 has a standard configuration as a general server device. The host status information is stored in the cache memory 22 and the memory 24 of the host 2.

In the present embodiment, the process status information including the statuses of the processes p1, p2, and p3 performed by the host 2 as "Run", "Ready", and "Wait" and the priority is used as host status information.

Figure 3:
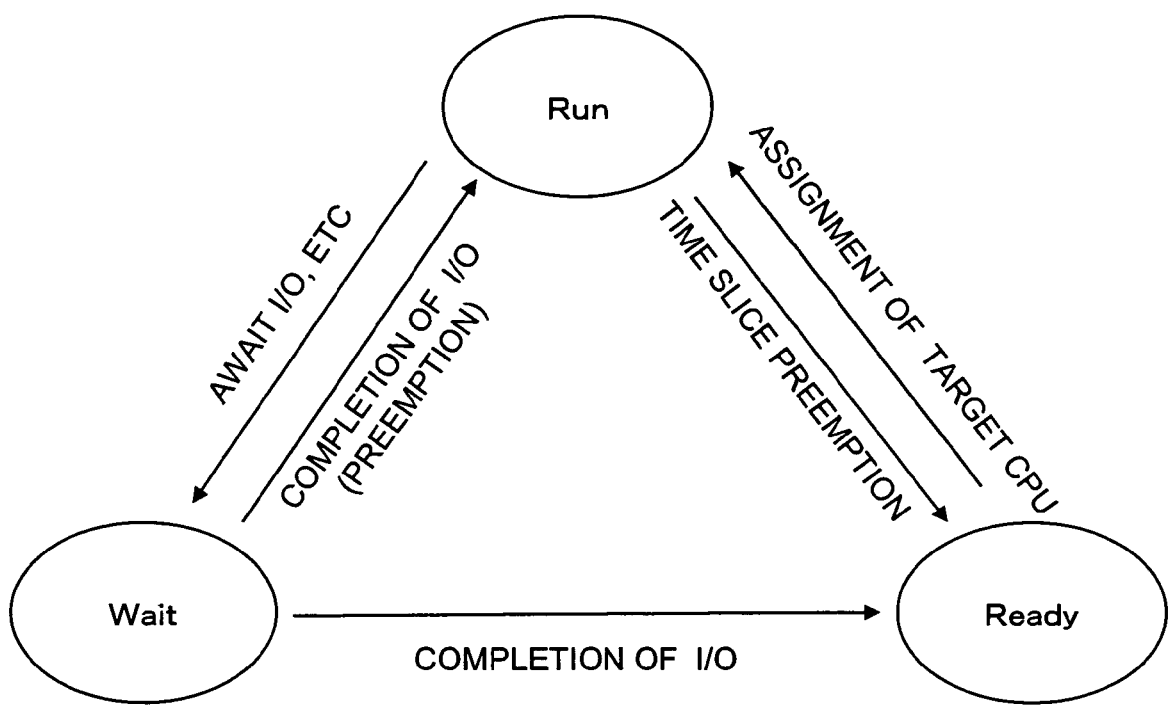
FIG. 3 is an explanatory view of the status of the process used as process status information according to an embodiment of the present invention.

FIG. 3 is an explanatory view of the status of the process used as the process status information in an embodiment of the present invention. The process corresponds any of the three statuses shown in FIG. 3, and the status is changed.

The "Run" status refers to the status (running) of actually performing the CPU processing with the current assignment of the CPU. The process of the "Run" status is changed to the "Ready" status when it is not assignment target of the CPU 21 by the time slice and preemption. In addition, it is changed to the "Wait" status when it becomes necessary to have an event of the completion of input/output (I/O), the completion of communication and the synchronous process, etc.

The "Ready" status refers to the status in which the process is not currently the assignment target of the CPU 21, but an event such as the completion of input/output is not being awaited, and the process can be immediately started when it is an assignment target. The process of the "Ready" status is changed to the "Run" status when it becomes an assignment target of the CPU 21 by the time slice and preemption.

The "Wait" status refers to the status in which an event such as the completion of input/output, etc. is awaited, and the process cannot be immediately performed as an assignment target of the CPU 21. The process in the "Wait" status is changed to either the "Run" status or the "Ready" status based on the priority relationship with other processes when an event such as the completion of input/output, etc. occurs.

The management of the process status somewhat depends on the operating system (OS) of the host 2. However, in the OS capable of realizing multitask management, each process is expressed by the status corresponding to any of the three statuses of "Run", "Ready", and "Wait", and the processes are managed with the transition among these statuses.

The priority of a process is a value indicating the priority with which the process runs by the host 2. In the processes in the "Ready" status, the process having the highest priority is selected as the process to next enter the "Run" status. The priority can be re-calculated.

Figure 4:
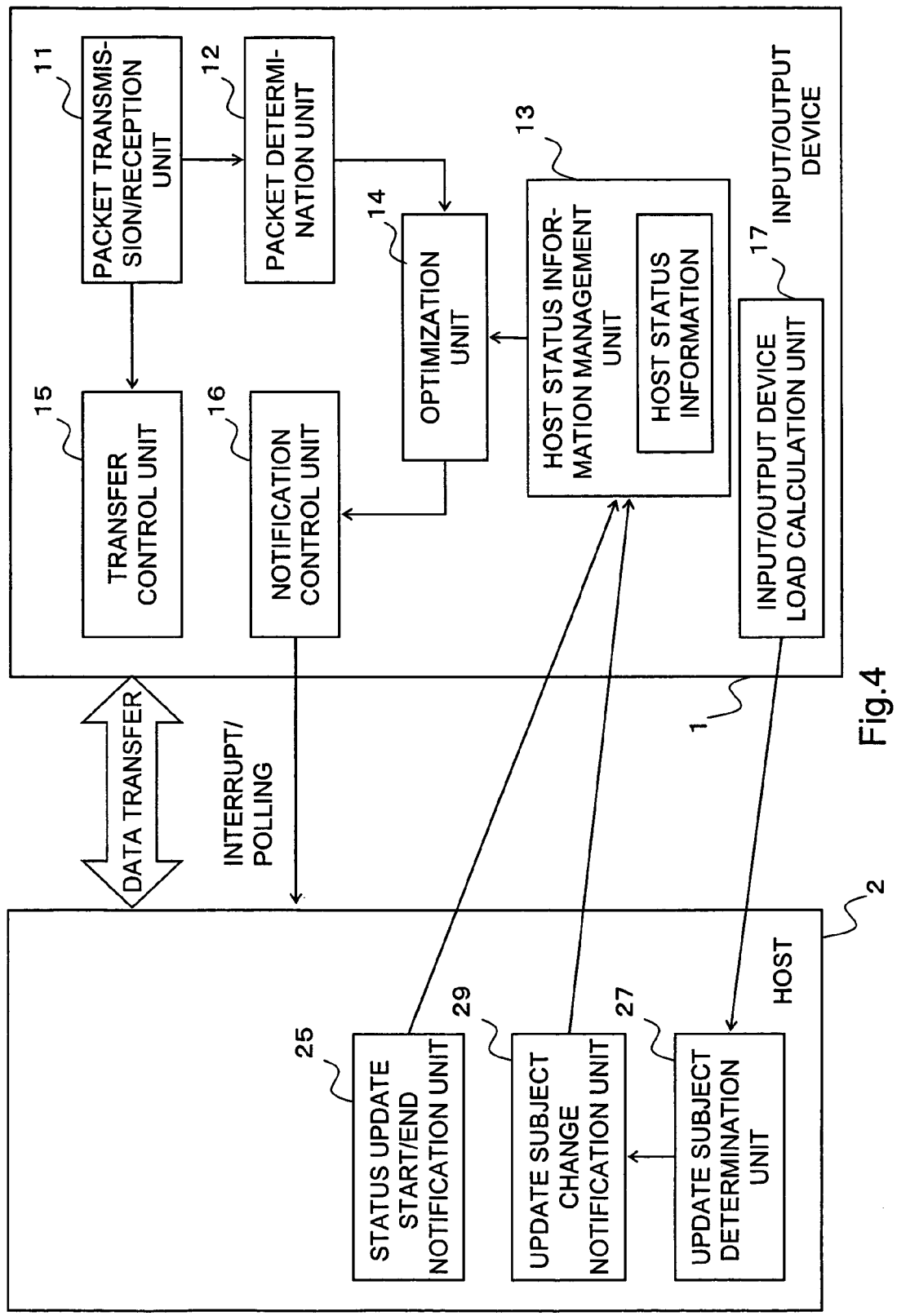
FIG. 4 shows an example of the configuration of the input/output device and the host according to the present invention.

FIG. 4 shows an example of the configuration of the input/output device 1 and the host 2 according to the present invention. The input/output device 1 includes a packet transmission/reception unit 11, a packet determination unit 12, a host status information management unit 13, an optimization unit 14, a transfer control unit 15, a notification control unit 16, and an input/output device load calculation unit 17.

The packet transmission/reception unit 11 is processing means for transmitting/receiving a packet over a network.

The packet determination unit 12 is processing means for referring to the header portion of a packet to be transmitted/received by the packet transmission/reception unit 11, and determining which process the packet relates to. The process to which the transmitted/received data packet is transferred is referred to as a target (destination) process.

The host status information management unit 13 is processing means for acquiring and storing the host status information to be stored in the memory 24 of the host 2.

The optimization unit 14 is processing means for acquiring a target process of a packet from the packet determination unit 12, acquiring the current process status information about the host 2 from the host status information management unit 13, selecting one of the notification of the transfer process of the input/output data by the interrupt process or the notification (by polling) by the non-interrupt process, and indicating a selection result (interrupt or polling) to the notification control unit 16.

The transfer control unit 15 is a processing means for transferring a packet between the input/output device 1 and the host 2.

The notification control unit 16 is processing means for notifying the host 2 of the notification of the transfer process of the transfer control unit 15 by the interrupt process or the polling process according to the selection of the optimization unit 14.

The input/output device load calculation unit 17 is processing means for calculating the load on the input/output device 1 itself using the number of packets per unit time in the input/output control, the data transfer rate, etc., and notifying the host 2 of the calculation result.

The host 2 includes a status update start/end notification unit 25, an update subject determination unit 27, and an update subject change notification unit 29.

The status update start/end notification unit 25 is processing means for setting a status update start flag area and a status update end flag area in a predetermined of the memory 24 to allow the input/output device 1 to collect and update the process status information, rewriting the status update start flag area when the update of the process status information is started, and rewriting the status update end flag area when the update of the process status information is completed, thereby notifying that the update of the process status information has started and completed.

The update subject determination unit 27 is processing means for comparing the load information about the CPU 21 with the load information about the input/output device 1 calculated by the input/output device load calculation unit 17, and determining the operation subject of the collecting/updating process on the process status information.

The update subject change notification unit 29 is processing means for notifying the input/output device 1 whether the operation subject of the collecting/updating process on the process status information determined by the update subject determination unit 27 is the host 2 or the input/output device 1.

Described below in detail is the optimizing process of transfer notification.

Figure 5:
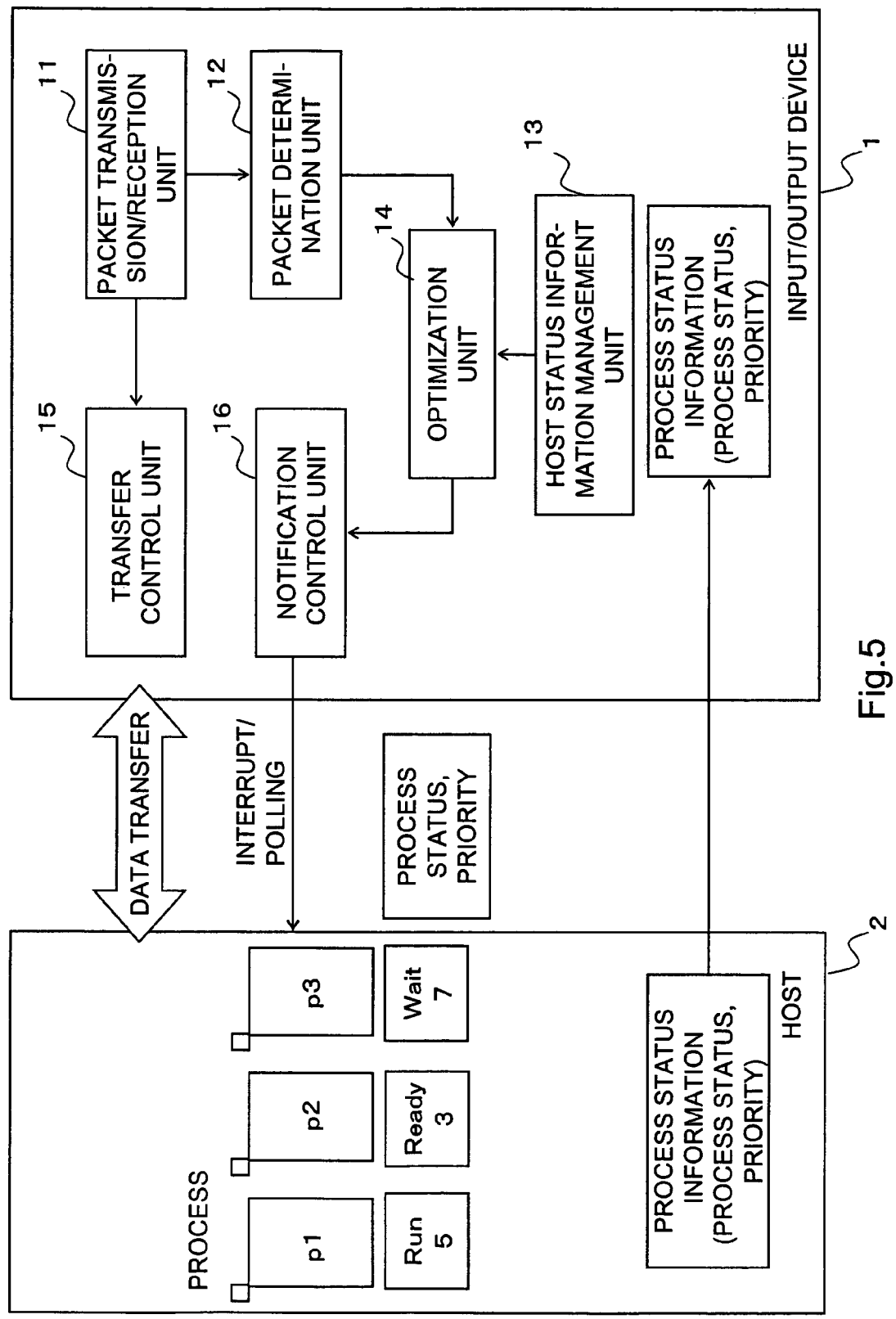
FIG. 5 is an explanatory view of the optimizing process on transfer notification based on the process status and priority.

As shown in FIG. 5, the host status information management unit 13 of the input/output device 1 acquires and stores the process status information (process status and priority) from the host 2.

The optimization unit 14 determines whether the notification of the transfer process is transmitted by the interrupt process or the polling process based on the target process of the input/output data determined by the packet determination unit 12 and the process status and the priority held by the host status information management unit 13. The optimization unit 14 selects the notification by the interrupt process when the target process is in the state of immediately changing to the "Run" status by the data transfer. Otherwise, the notification by the polling process is selected.

The notification control unit 16 performs interrupt or polling for the CPU 21 according to the selection of the optimization unit 14.

Figure 6:
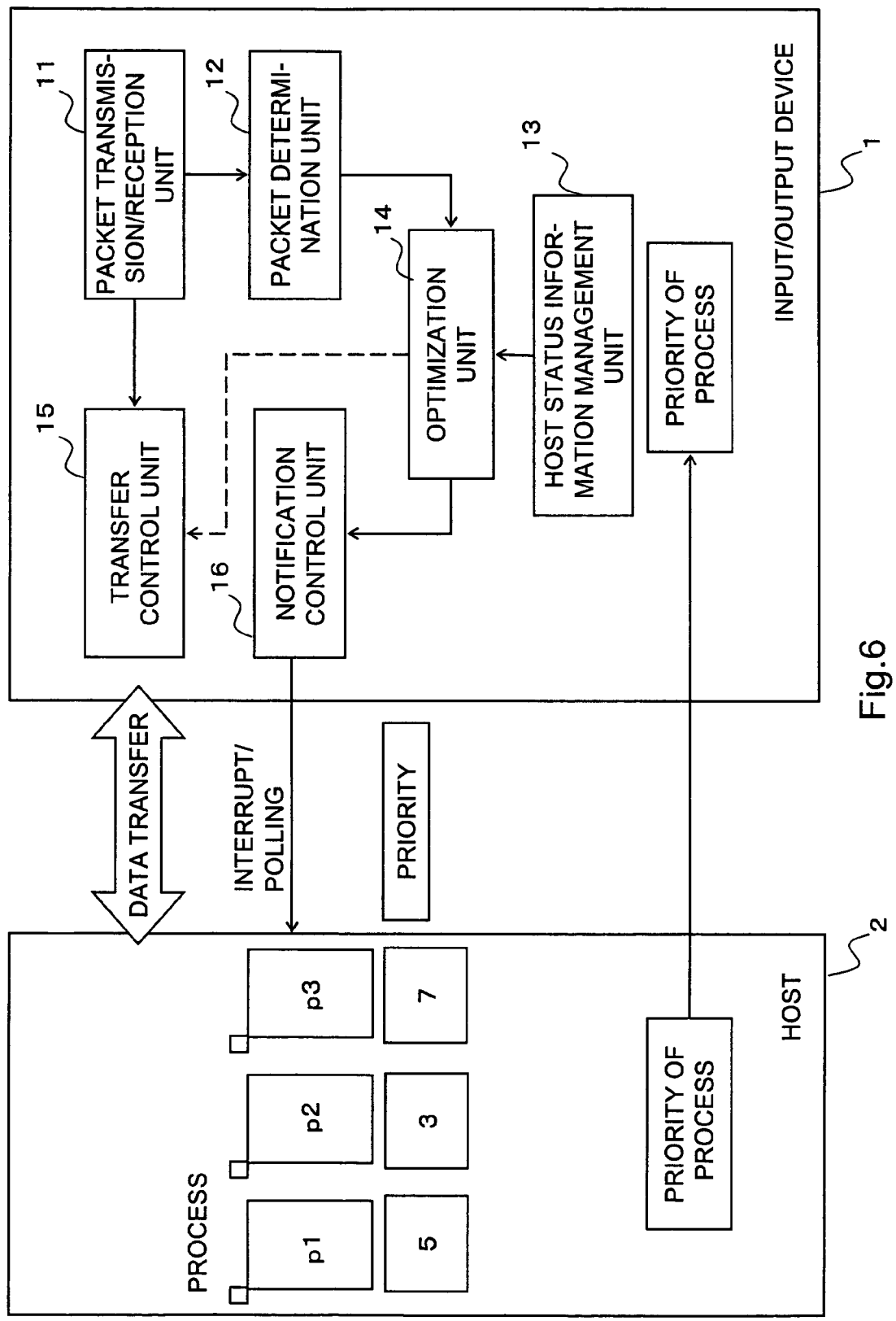
FIG. 6 is an explanatory view showing the optimizing process on transfer notification based on the priority of a process.

As shown in FIG. 6, the host status information management unit 13 can acquire and store the priority of a process from the host 2. The optimization unit 14 selects the notification by the interrupt process when the target process is assigned a high priority and the process is immediately changed to the "Run" status by the data transfer. Otherwise, the notification by the polling process is selected.

Figure 7:
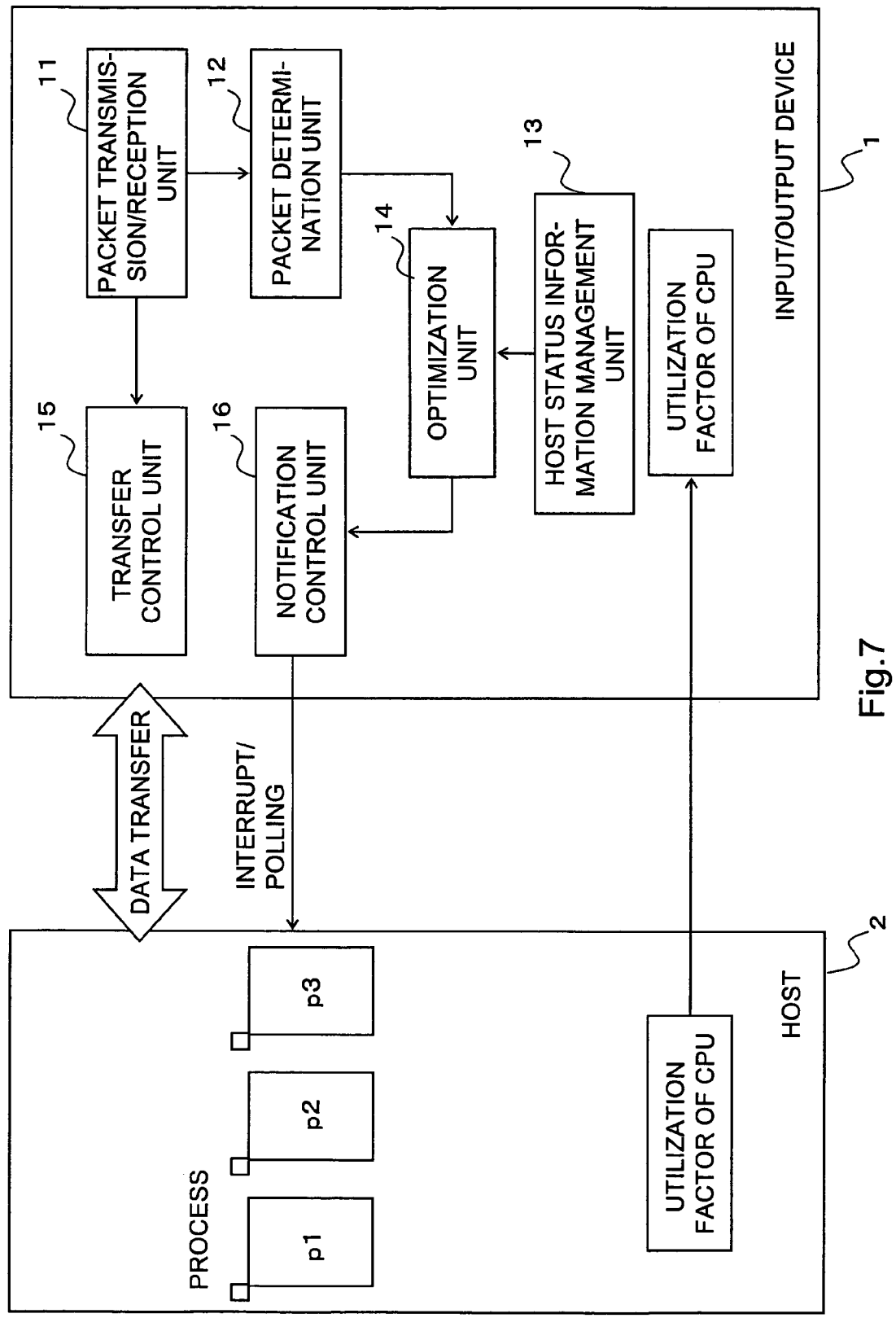
FIG. 7 is an explanatory view of the optimizing process on transfer notification based on the utilization factor of the CPU.

As shown in FIG. 7, the host status information management unit 13 can acquire and store the utilization factor of the CPU of the CPU 21 from the host 2. When the utilization factor of the CPU is lower than a predetermined value, the optimization unit 14 selects the notification by the interrupt process. When the utilization factor of the CPU is higher than the predetermined value, it selects the notification by the polling process.

Figure 8:
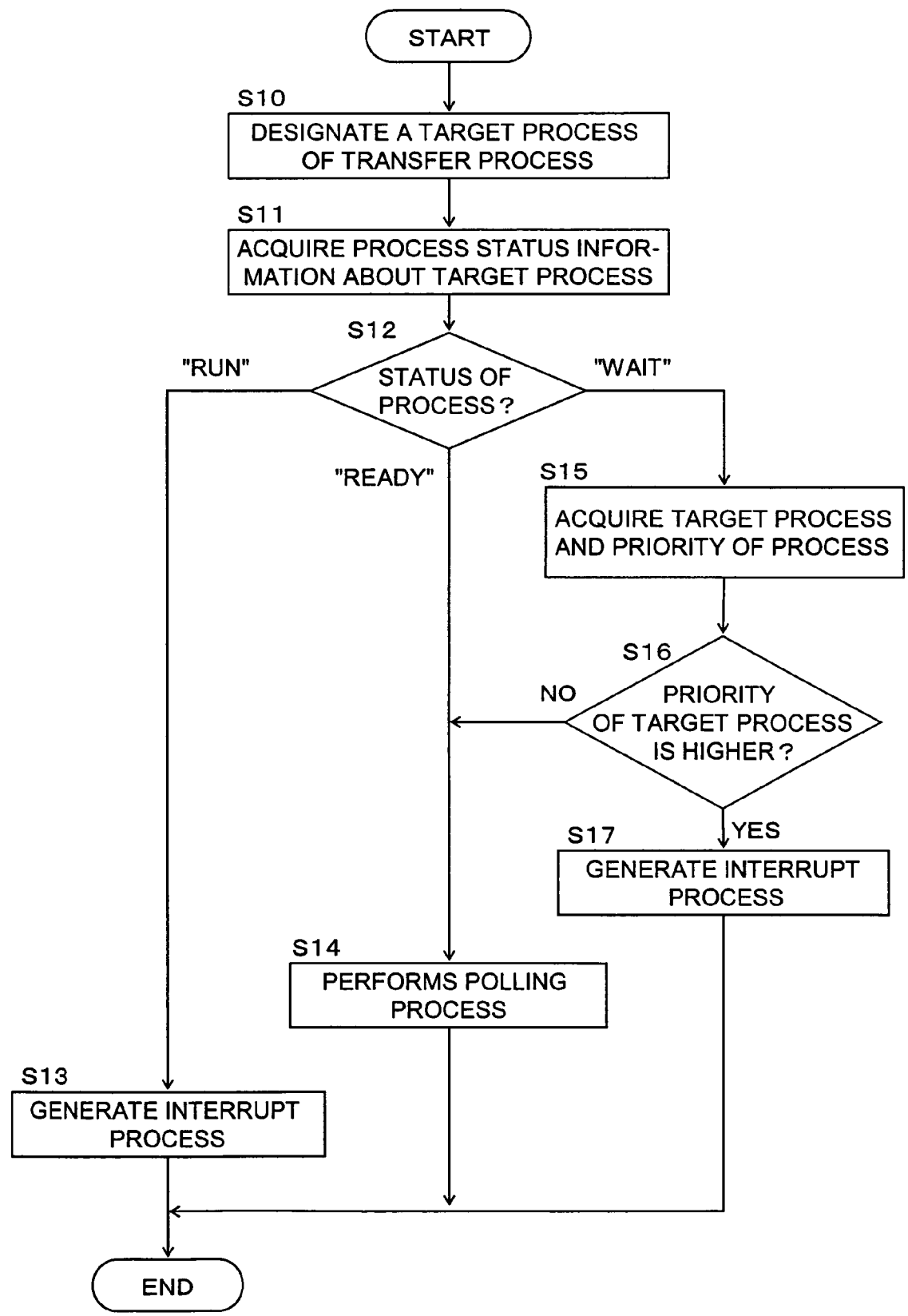
FIG. 8 shows an example of the flow of the optimizing process on the notification of the transfer process.

FIG. 8 shows an example of the flow of the optimizing process of the notification by the transfer process.

Before the optimizing process of the notification by the transfer process, the host status information management unit 13 assumes that the status information holding unit 135 stores the process status information about the process performed by the host 2 and the priority of the process.

The optimization unit 14 designates a target process of the transfer process from the input/output processed data determined by the packet determination unit 12 and (packet) (step S10). Furthermore, it acquires the process status information about the target process from the host status information management unit 13 (step S11).

If the status of the target process is the "Run" status (step S12), then the interrupt process is selected, and the notification control unit 16 generates the interrupt process (step S13) because a packet to be immediately transferred can be required if the target process is in the "Run" status.

If the status of the target process is the "Ready" status (step S12), then the notification control unit 16 does not generate the interrupt process, but performs the polling process (step S14) because there is no possibility that the target process is changed to the "Run" status with the priority raised although a packet is received.

If the status of the target process is the "Wait" status (step S12), then the notification control unit 16 acquires the target process and the priority of the process currently being performed ("Run" status) in the host 2 from the host status information management unit 13 (step S15).

Then the priorities are compared (step S16). If the priority of the target process is higher (YES in step S16), then the interrupt process is generated (step S17). Since the priority of the target process is higher than that of the process in the "Run" status, there is the possibility that the target process is changed from the "Wait" status to the "Run" status upon receipt of a packet. If the priority of the target process is lower (NO in step S16), then the polling process is performed (step S14). Since the priority of the process in the "Run" status is higher than that of the target process, there is no possibility that the target process is changed from the "Wait" status to the "Run" status upon receipt of a packet.

Figure 9:
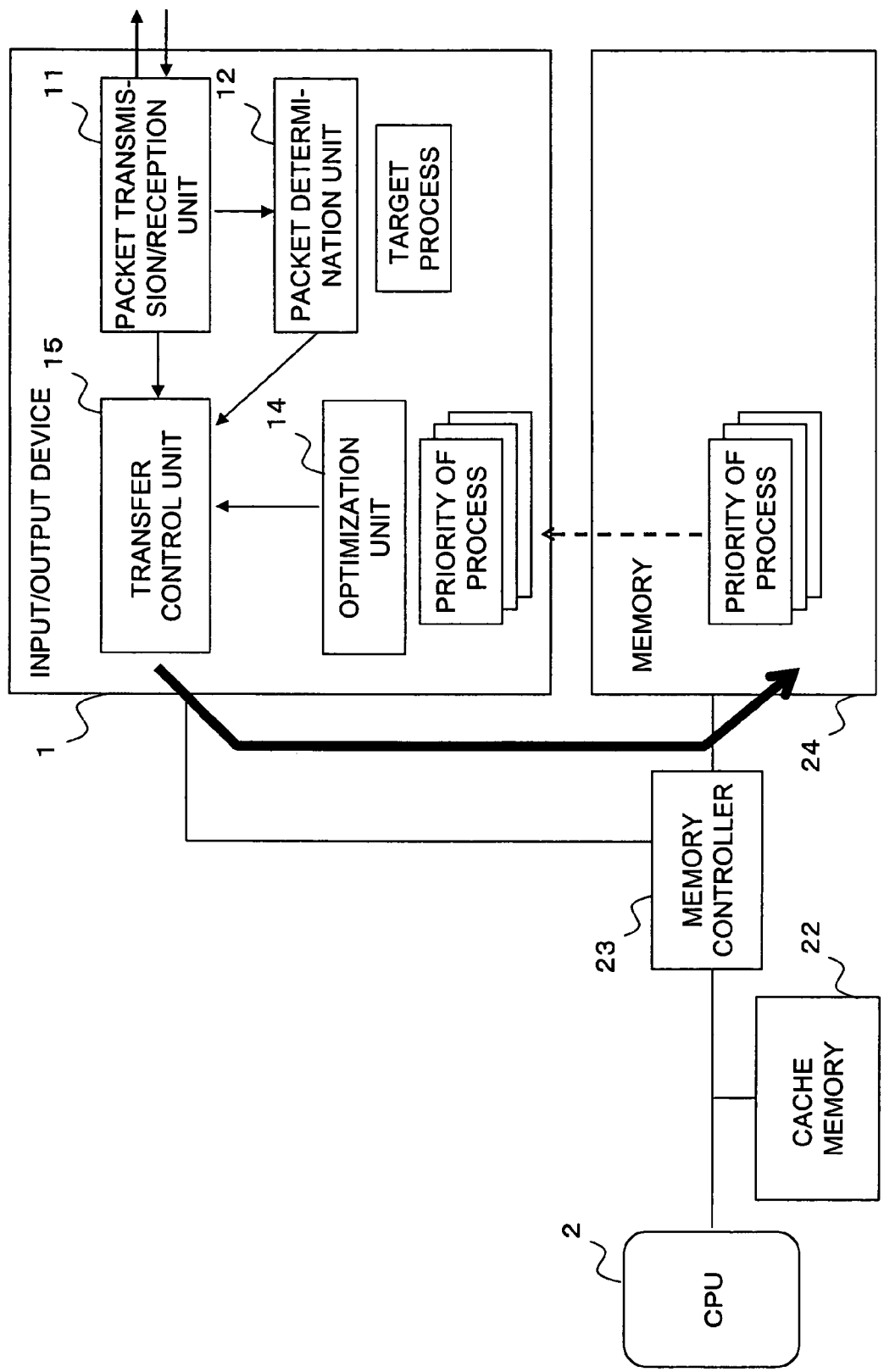
FIG. 9 is an explanatory view of the optimizing process on the order of the transfer process of input/output data.

The optimization unit 14 optimizes the order of the transfer process in the transfer process of the input/output data. The optimization unit 14 indicates the transfer control of the data of a higher process priority to the transfer control unit 15 by referring to the process status information. The transfer control unit 15 transfers corresponding input/output data to the memory 24 in order from the highest priority of the target process of the input/output data to be transferred as shown in FIG. 9.

Described below in detail is the collecting/updating process of the host status information.

Figure 10:
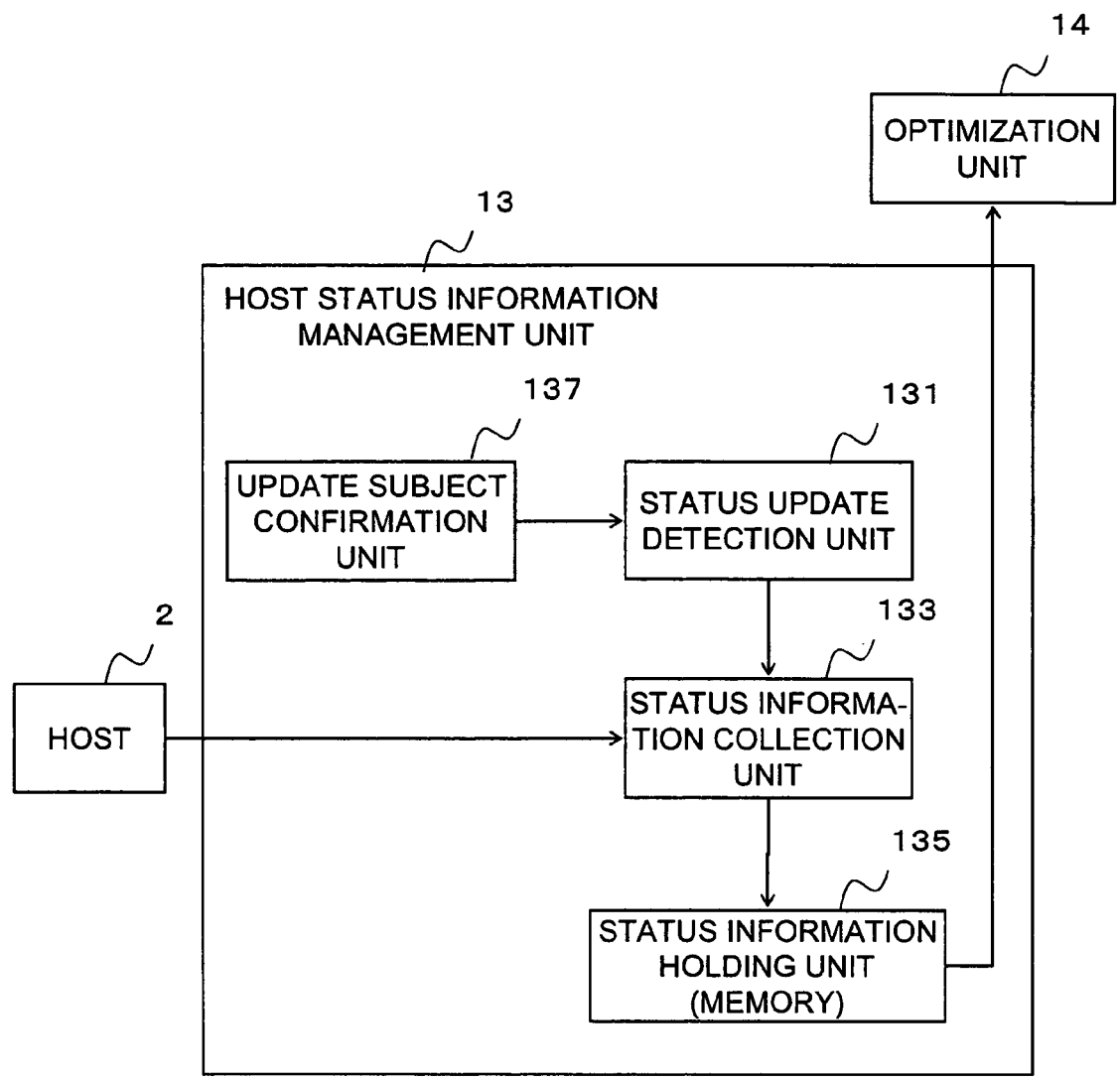
FIG. 10 shows an example of the configuration of the processing unit of the host status information management unit.

FIG. 10 shows an example of the configuration of the processing unit of the host status information management unit 13. The host status information management unit 13 includes a status update detection unit 131, a status information collection unit 133, a status information holding unit 135, and an update subject confirmation unit 137.

The status update detection unit 131 is processing means for detecting the update of the process status information according to the notification of the start of the update or the end of the update from the status update start/end notification unit 25.

The status information collection unit 133 is processing means for collecting the updated process status information according to the address information about the updated process status information detected by the status update detection unit 131, and storing the information in the status information holding unit 135. The status information collection unit 133 receives the host status information from the host 2, and stores it in the status information holding unit 135. The process status information stored in the status information holding unit 135 is referred to by the optimization unit 14.

The update subject confirmation unit 137 is processing means for activating the status update detection unit 131 according to the setting of the operation subject of the collecting/updating process of the process status information notified by the update subject change notification unit 29 when the update subject is the input/output device 1.

The process status, the process priority, the utilization factor of the CPU, etc. that are used as host status information are stored in the memory 24 of the host or in the cache memory 22. These pieces of information are changed and the process status information stored in the memory 24 is updated by the CPU 21. Since the host status information management unit 13 of the input/output device 1 also stores the host status information, it is necessary to update the host status information held in the input/output device 1 when the CPU 21 updates the host status information.

Therefore, when the CPU 21 updates the host status information in the memory 24 of the host 2, it simultaneously updates the host status information in the status information holding unit 135 of the input/output device 1. Or, the host status information management unit 13 of the input/output device 1 detects the update of the host status information about the host 2, refers to the updated host status information in the memory 24 of the host 2, and updates the host status information held in the input/output device 1.

Since the process status information used as the host status information is distributed and stored in the memory 24, it is necessary to efficiently detect the update of the process status information. Therefore, the cache consistency maintenance facility of the memory controller 23 is used in updating the process status information.

Figure 11:
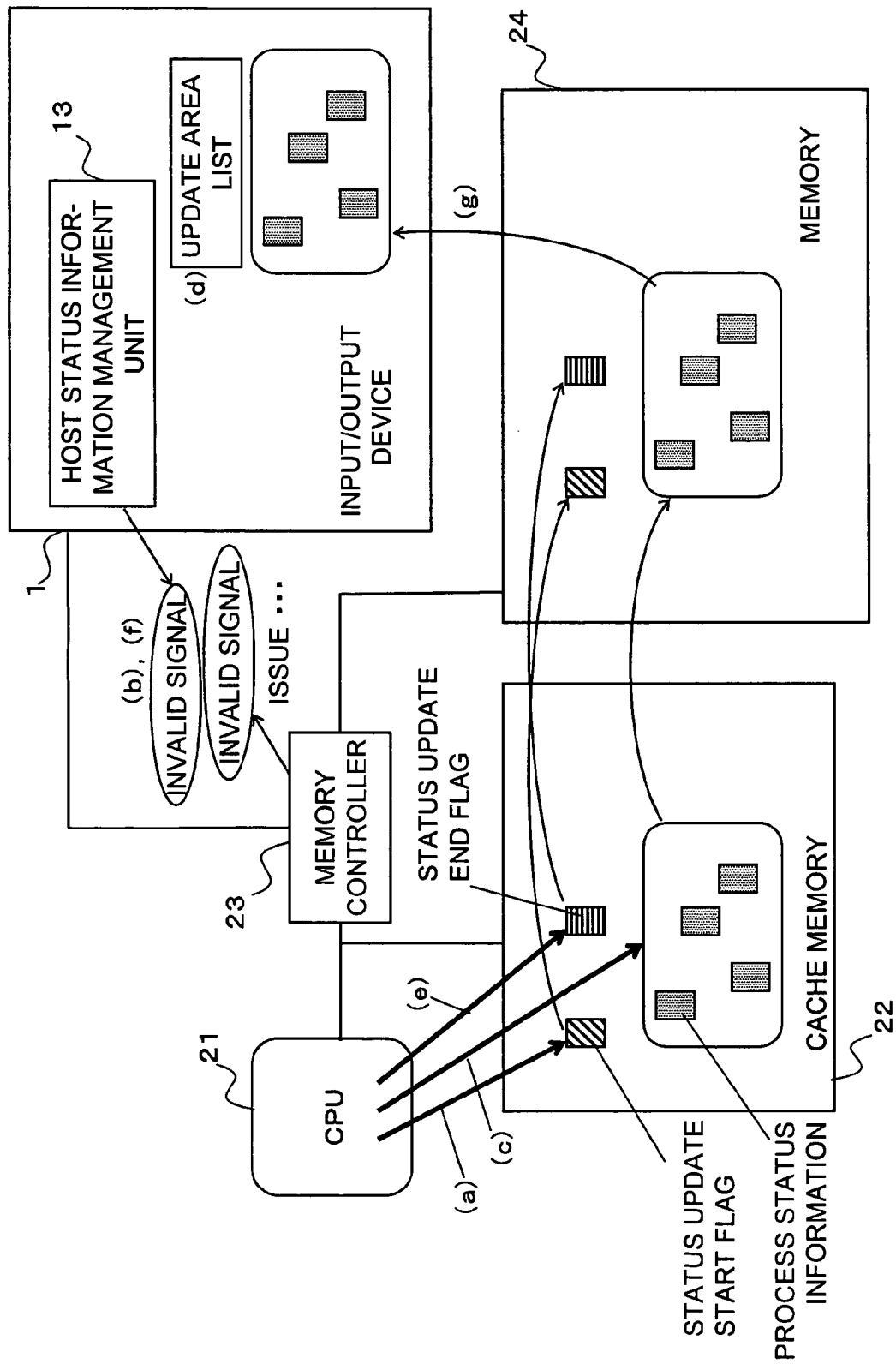
FIG. 11 is an explanatory view of the update detecting process of the process status information based on the cache consistency maintenance facility.

FIG. 11 is an explanatory view of the update detecting process of the process status information using the cache consistency maintenance facility.

(a) The CPU 21 which operates the status update start/end setting unit 25 starts the update of the process status information by writing data to the status update start flag area of the cache memory 22. The memory controller 23 issues an invalid signal (invalid notification) for the area of the memory 24.

(b) The status update detection unit 131 of the host status information management unit 13 monitors the status update start flag area, and starts monitoring the update of the process status information when it detects the invalid signal by the update of the status update start flag area.

(c) The CPU 21 updates the process status information.

(d) The status update detection unit 131 detects all invalid signals by the CPU 21, lists the process status information area to be updated, and records the address information about the process status information area stored in the list.

(e) The CPU 21 that operates the status update start/end setting unit 25 stops the update of the process status information by writing data to the status update end flag area of the cache memory 22. The memory controller 23 issues an invalid signal (invalid notification) for the area of the memory 24.

(f) The status update detection unit 131 monitors the status update end flag area, and stops monitoring the update of the process status information when it detects the invalid signal by the update of the status update end flag area.

(g) The status information collection unit 133 collects the updated process status information in the memory 24 according to the address information recorded by the status update detection unit 131, and stores it in the status information holding unit 135.

Thus, by monitoring the two specific flag areas, the start and the end of the update of the process status information are designated, and the updated process status information can be collected together, thereby efficiently collecting the host status information.

The update process of the host status information causes a heavy load on both the host 2 and the input/output device 1. Therefore, the load statuses of the host 2 and the input/output device 1 are compared with each other, and the process is performed in the device having a lower load.

The update subject determination unit 27 of the host 2 acquires the utilization factor of the CPU of the host 2, the number of process packets per unit time of the input/output device 1, the data transfer rate, etc., compares the load status of the host 2 with the load status of the input/output device 1, and determines the device having a lower load as an operation subject of the update process. The update subject change notification unit 29 notifies the input/output device 1 of the determination of the update subject determination unit 27.

To efficiently notify the input/output device 1 of the change of the operation subject of the update process at a low cost, the memory consistency maintenance facility of the memory controller 23 is used.

FIG. 12 is an explanatory view of the change notification process of the operation subject of the update process using the cache consistency maintenance facility.

(s) The CPU 21 operating the update subject change notification unit 29 writes data to the updating operation subject change flag area of the cache memory 22 when the operation subject of the update process is changed. The memory controller 23 issues an invalid signal (invalid notification) for the area of the memory 24.

(t) The update subject confirmation unit 137 monitors the updating operation subject change flag area, and detects the invalid signal by the update of the updating operation subject change flag area.

(u) Then, the update subject confirmation unit 137 updates the updating operation subject change flag area. The updating operation subject flag area is an area in which the two operation subjects of the host 2 and the input/output device 1 are set in the toggle state.

As described above, the operation subject of the update process can be changed at a low cost only by detecting an invalid signal when the updating operation subject change flag area is rewritten in the memory 24.

What is claimed is:

1. A data input/output device which controls input/output of data to and from a host processing device as a host device, comprising:

a host status information storage unit holding host status information including priorities of host device processes which are performed or are to be performed in the host device;

an input/output notification unit notifying the host device of data input/output control by a notification including either an interrupt notification process of performing an interrupt in the host device or a non-interrupt notification process of not performing the interrupt;

a host status information acquisition unit acquiring the host status information from the host device, the host status information indicating a status of one or more of the host device processes performed in the host device by each of "Run", "Ready", or "Wait" status and indicating a priority of each host device process which is performed or is to be performed in the host device, and storing the host status information in the host status information storage unit; and an optimization unit designating a target host device process from among the host device processes in the host device, for handling data in the data input/output control, and selecting one of the interrupt notification process or the non-interrupt notification process according to a status and priority of the target host device process, wherein the input/output notification unit notifies the host device of the data input/output by the notification selected by the optimization unit according to the status and the priority of the target host device process.

2. The data input/output device according to claim 1, wherein:

the optimization unit designates a target host device process in the host device, handling data in the data input/output control, according to the process status information stored in the host status information storage unit, compares the priority of the target host device process with a priority of a host device process currently being processed in the host device, and selects the notification by the non-interrupt process when the priority of the target host device process is lower than the priority of the host device process currently being performed.

3. The data input/output device according to claim 1, wherein the optimization unit selects the notification by the non-interrupt process when the status of the target host device process is either the "Ready" status representing the host device process is ready to be executed or the "Wait" status representing the host device process is waiting.

4. The data input/output device according to claim 2, wherein the optimization unit compares the priority of the target host device process with a priority of a host device process currently being processed in the host device when the status of the target host device process is the "Wait" status, and selects the notification by the non-interrupt process when the priority of the target host device process is lower than the priority of the host device process currently being performed.

5. The data input/output device according to claim 1, wherein the host status information acquisition unit acquires a utilization factor of a CPU of the host device, and stores the factor in the host status information storage unit; and the optimization unit selects the notification by the non-interrupt process when the utilization factor of the CPU of the host status information storage unit is equal to or lower than a predetermined value.

6. A data input/output device which controls input/output of data to and from a host processing device as a host device, comprising:

a host status information storage unit storing host status information including priorities of host device processes in "WAIT" or "Ready" status to be performed in the host device;

an input/output notification unit notifying the host device of data input/output control by a notification including either an interrupt notification process of performing an interrupt in the host device or a non-interrupt notification process of not performing the interrupt;

a host status information acquisition unit acquiring the host status information from the host device and storing the host status information in the host status information storage unit;

an optimization unit acquiring a priority of a target host device process in the host device to which data packet transmitted or received in the data input/output control is to be transferred, comparing priorities of the target host device process and a host device process currently performing in the host device and determining the interrupt notification process when the priority of the target host device process is higher than the currently performed host device process, or selecting the interrupt notification process when the priority of the target host device process is higher than the currently performed host device process and a status of the target host device process is to be transited directly to the "Run" status by transferring the data packet in the data input/output control; and a transfer control unit controlling data transfer according to the notification determined by the optimization unit.

7. A data processing system configured by a host processing device as a host device and a data input/output device which makes notification by one of an interrupt notification process of performing an interrupt in the host device or a non-interrupt notification process of not performing the interrupt as the notification of the data transfer process in controlling input/output in the host device, wherein the data input/output device comprises:

a host status information storage unit;

a host status information acquisition unit acquiring, from the host device, host status information about a status of the host device, the host status information indicating a status of one or more host device processes performed in the host device by each of "Run", "Ready", or "Wait" status and indicating a priority of each host device process which is performed or is to be performed in the host device, and storing the host status information in the host status information storage unit;

an optimization unit designating a target host device process from among the host device processes in the host device, for handling data in the data input/output control, and selecting one of an interrupt notification process or a non-interrupt notification process according to a host status and a priority of the target host device process; and an input/output notification unit notifying the host device of data transfer by the notification selected by the optimization unit.

8. The data processing system according to claim 7, wherein:

the host device comprises an updating operation subject notification unit setting one of the data input/output device and the host device as the operation subject and notifying the data input/output device of a setting result, when a collecting/updating of the host status information about the host status information storage unit is performed with one of the data input/output device and the host device as the operation subject;

the data input/output device comprises:

an updating operation subject storage unit storing one of the host device and the data input/output device as the operation subject notified by the host device; and an updating operation subject setting unit setting the operation subject of the updating operation subject storage unit according to the operation subject set by the host device; and the host status information acquisition unit collects the host status information from the host device when the data input/output device is set in the updating operation subject storage unit, and receives the host status information transmitted from the host device when the host device is set in the updating operation subject storage unit.

9. A method of data input/output by a computer controlling input/output of data to a host device, the method comprising:

acquiring host status information from the host device, the host status information indicating a status of one or more host device processes performed in the host device by each of "Run", "Ready", or "Wait" status and indicating a priority of each host device process which is performed or is to be performed in the host device, and storing the host status information;

designating a target host device process from among the host device processes in the host device, which relates to handling data in the data input/output control;

selecting one of an interrupt notification process or the non-interrupt notification process according to a stored host status and a priority of the target host device process; and transmitting the notification selected based upon the host status and the priority of the target host device process for data input/output to the host device.

10. The data input/output method according to claim 9, wherein the designating of the target host device process further comprises comparing the priority of the target host device process with a priority of a host device process currently being processed in the host device, and the selecting selects the notification by the non-interrupt process when the priority of the target host device process is lower than the priority of the host device process currently being performed.

11. The data input/output method according to claim 9, wherein the selecting selects the notification by the non-interrupt process when the status of the target host device process is either the "Ready" status representing the host device process is ready to be executed or the "Wait" status representing the host device process is waiting.

12. The data input/output method according to claim 10, wherein the designating of the target host device process compares the priority of the target host device process with a priority of a host device process currently being processed in the host device when the status of the target host device process is the "Wait" status, and the selecting selects the notification by the non-interrupt process when the priority of the target host device process is lower than the priority of the host device process currently being performed.

13. The data input/output method according to claim 9, wherein the acquiring of the host status information acquires a utilization factor of a CPU of the host device, and stores the factor; and the selecting selects the notification by the non-interrupt process when the utilization factor of the CPU of the stored host status information is equal to or lower than a predetermined value.

14. The data input/output device according to claim 1, wherein the optimization unit selects the notification by the non-interrupt process when the status of the target host device process is the "Run" status representing the host device process is executing.

15. The data input/output device according to claim 1, wherein:

the optimization unit compares the priority of the target host device process with a priority of a host device process currently executing in the host device when the status of the target host device process is the "Wait" status, and selects the notification by the interrupt process when the priority of the target host device process is higher than the priority of the host device process currently executing in the host device.

16. The method according to claim 9, wherein the selecting selects the notification by the non-interrupt process when the status of the target host device process is the "Run" status representing the host device process is executing.

17. The method according to claim 9, wherein:

the designating of the target host device process compares the priority of the target host device process with a priority of a host device process currently executing in the host device when the status of the target host device process is the "Wait" status, and the selecting selects the notification by the interrupt process when the priority of the target host device process is higher than the priority of the host device process currently executing in the host device.

* * * * *

UNITED STATES PATENT AND TRADEMARK OFFICE
CERTIFICATE OF CORRECTION

PATENT NO.        : 7,676,610 B2
APPLICATION NO.   : 11/342834
DATED             : March 9, 2010
INVENTOR(S)       : Kohta Nakashima et al.

It is certified that error appears in the above-identified patent and that said Letters Patent is hereby corrected as shown below:

Title Page, Column 1, item (54), Line 1, change "DEVICE AND METHOD" to --INFORMATION PROCESSOR AND INFORMATION PROCESSING METHOD--.

Column 1, Line 1, change "DEVICE AND METHOD" to --INFORMATION PROCESSOR AND INFORMATION PROCESSING METHOD--.

Column 12, Line 33, change ""WAIT"" to --"Wait"--.

Signed and Sealed this

Seventh Day of September, 2010

David J. Kappos
*Director of the United States Patent and Trademark Office*